United States Patent
Matsuki et al.

(10) Patent No.: US 8,629,862 B2
(45) Date of Patent: Jan. 14, 2014

(54) DISPLAY WITH PSEUDO PHOTO SENSOR

(75) Inventors: Fumirou Matsuki, Kobe (JP);
Kazuyuki Hashimoto, Kobe (JP)

(73) Assignee: Innolux Corporation, Jhu-Nan, Miao-Li County (TW)

( * ) Notice: Subject to any disclaimer, the term of this patent is extended or adjusted under 35 U.S.C. 154(b) by 527 days.

(21) Appl. No.: 12/707,640

(22) Filed: Feb. 17, 2010

(65) Prior Publication Data

US 2010/0238150 A1    Sep. 23, 2010

(30) Foreign Application Priority Data

Feb. 23, 2009  (JP) .................................. 2009-038758

(51) Int. Cl.
*G09G 3/30* (2006.01)
*G09G 5/00* (2006.01)
*G06F 3/038* (2013.01)
*H01L 27/146* (2006.01)
*H01L 31/0232* (2006.01)

(52) U.S. Cl.
USPC ............. 345/207; 345/77; 345/204; 257/435; 257/436

(58) Field of Classification Search
USPC .................................. 345/48, 77, 207; 257/436
See application file for complete search history.

(56) References Cited

U.S. PATENT DOCUMENTS

| | | | |
|---|---|---|---|
| 7,655,889 B2 * | 2/2010 | Nakamura et al. | 345/77 |
| 7,812,906 B2 * | 10/2010 | Eguchi | 345/175 |
| 2008/0111779 A1 * | 5/2008 | Matsumoto | 345/87 |
| 2008/0204642 A1 | 8/2008 | Kobashi | |
| 2008/0245948 A1 | 10/2008 | Tsai | |
| 2010/0060562 A1 | 3/2010 | Hadwen et al. | |
| 2010/0097838 A1 | 4/2010 | Tanaka et al. | |

FOREIGN PATENT DOCUMENTS

| | | |
|---|---|---|
| CN | 101256296 | 9/2008 |
| CN | 101281916 | 10/2008 |
| JP | 1-278079 | 11/1989 |
| JP | 01278079 A * | 11/1989 |
| JP | 2007-94098 | 4/2007 |
| JP | 2007-304520 | 11/2007 |
| TW | 200935615 | 8/2009 |
| WO | 99/22962 | 5/1999 |
| WO | 2008/096892 | 8/2008 |
| WO | 2008/130060 | 10/2008 |

* cited by examiner

*Primary Examiner* — Bipin Shalwala
*Assistant Examiner* — Ryan A Lubit
(74) *Attorney, Agent, or Firm* — Kirton McConkie; Evan R. Witt

(57) ABSTRACT

A display capable of performing ambient light detection with a high accuracy is provided. The display device is a display device having a backlight and a photo sensor for detecting ambient light and outputting a photocurrent according to an intensity of the ambient light, and further including a light-shielding member disposed below the photo-sensor for shielding light from the backlight; and a pseudo photo sensor disposed above the light-shielding member around the photo sensor. The pseudo photo sensor is made of the same material as the photo sensor, and formed in the same process as the photo sensor.

6 Claims, 4 Drawing Sheets

DISPLAY WITH PSEUDO PHOTO SENSOR

FIELD OF THE INVENTION

The present invention relates to a display device having a backlight source and a photo sensor for detecting ambient light and outputting a photocurrent according to an intensity of the ambient light, and an electronic apparatus equipped with such a display.

BACKGROUND OF THE INVENTION

A display device used in an electronic apparatus, particularly a mobile apparatus frequently used outdoors, e.g. a car navigation device, a mobile phone, etc., is generally equipped with a display device which exhibits an illumination-adjusting function for adjusting display illuminance according to the intensity of ambient light. For example, the PCT Japanese Patent Publication No. 2001-522058 discloses a display system which includes an illumination controller capable of changing display illuminance according to ambient light detected by an ambient light photo sensor. With the adjustment, illuminance is increased in bright places such as outdoors in the daytime and decreased in dark places such as indoors in the nighttime.

SUMMARY OF THE INVENTION

However, in the prior art display device, the photo sensor is likely affected by the backlight source, and thus a problem that the ambient light cannot be accurately detected is raised.

In view of the problem, an object of the present invention is to provide a display device capable of detecting ambient light with enhanced accuracy and an electronic apparatus equipped with such a display device.

In order to achieve the object mentioned above, there is provided a display device having a backlight source and a photo sensor for detecting ambient light and outputting a photocurrent according to an intensity of the ambient light, and further comprising: a light-shielding member disposed below the photo sensor for shielding light from the backlight source; and a pseudo photo sensor disposed above the light-shielding member around the photo sensor. The pseudo photo sensor is made of the same material as the photo sensor, and formed in the same process as the photo sensor.

By arranging the pseudo photo sensor around the photo sensor, light scattering of the emitted light from the backlight inside the display device can be inhibited so as to provide the display device capable of detecting ambient light with enhanced accuracy and an electronic apparatus equipped with such a display device. Furthermore, since the pseudo photo sensor and the photo sensor are made of the same material, it is not necessary to perform an additional or specific process in order to produce a material which may achieve the similar effect of inhibiting light scattering inside the display device.

In the display device according to the present invention, the pseudo photo sensor is an amorphous diode or an LTPS photo-diode.

The display device according to the present invention is a transparent or semi-transparent display.

The display device according to an embodiment of the present invention can be used in an electronic apparatus equipped with a display device with an ambient-light-detecting function. Examples include a laptop PC, mobile phone, portable personal digital assistant (PDA), car navigation device and portable game set.

According to the present invention, a display device capable of detecting ambient light with enhanced accuracy and an electronic apparatus equipped with such a display device are provided.

DETAILED DESCRIPTION OF THE PREFERRED EMBODIMENT

Hereinafter, embodiments according to the present invention are described with reference to the accompanying drawings.

Figure 1:
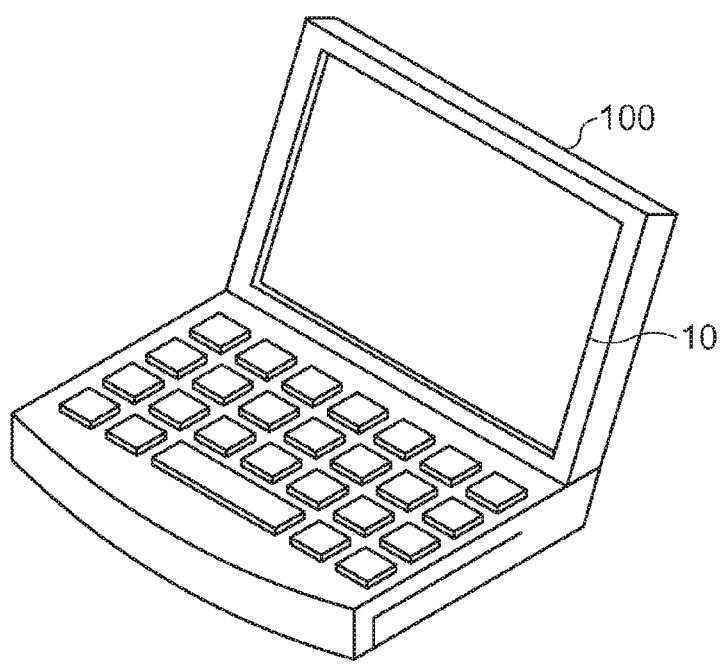
FIG. 1 illustrates an example of an electronic apparatus equipped with a display device according to an embodiment of the present invention.

FIG. 1 illustrates an example of an electronic apparatus equipped with a display device according to an embodiment of the present invention.

The electronic apparatus 100 as shown in FIG. 1 is a laptop PC. Alternatively, it can also be another electronic apparatus, e.g. a mobile phone, portable personal digital assistant (PDA), car navigation device or portable game set. The electronic apparatus 100 has a display device 10 which includes a display panel for displaying images, etc.

Figure 2:
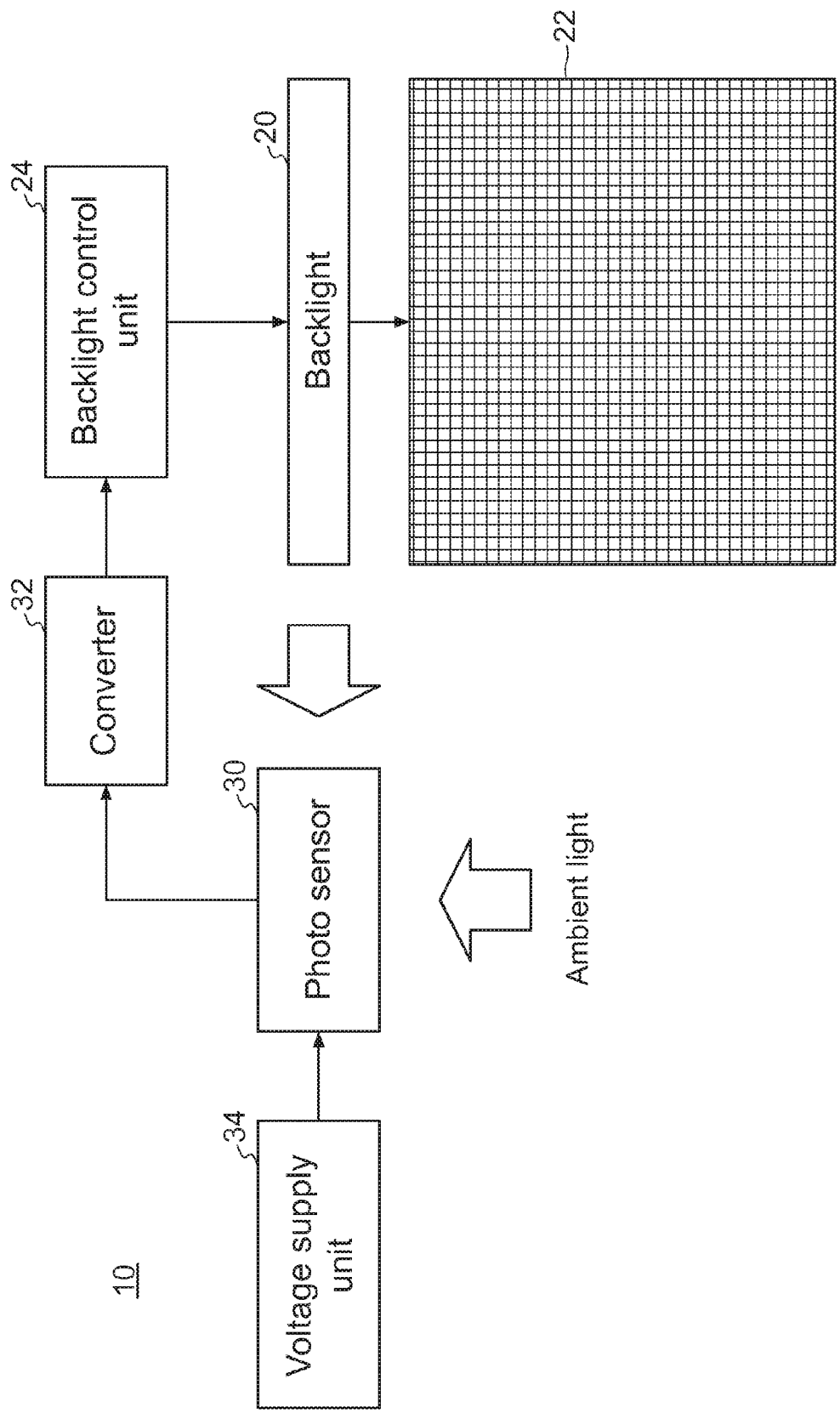
FIG. 2 illustrates construction of a display device according to an embodiment of the present invention.

FIG. 2 illustrates construction of a display device according to an embodiment of the present invention.

The display device 10 as shown in FIG. 2, for example, is a transparent or semi-transparent liquid crystal display, and includes a backlight 20, a liquid crystal display (LCD) panel 22 and a backlight control unit 24. The backlight 20 is disposed at the backside of the LCD panel 22 having pixels arranged in matrix for illuminating the pixels. The LCD panel 22 utilizes the change in alignment of liquid crystal molecules caused by a voltage to transmit or obstruct the light from the backlight 20 for displaying images. The backlight control unit 24 controls the operations of the backlight 20. For example, it may control the on/off state of the backlight 20 and adjust the intensity of the emitted light from the backlight 20.

Moreover, the display device 10 further includes a photo sensor 30, a converter 32 and a voltage supply unit 34. The photo sensor 30 is formed on a glass substrate of the LCD panel 22 for detecting ambient light, and outputting photocurrent in response to the light quantity emitted thereto, i.e. the intensity of ambient light. The converter 32 transforms the photocurrent outputted by the photo sensor 30 into a voltage or digital pulse signal, which is inputted to the backlight control unit 24. The converter 32 is optional, and can be omitted if the photocurrent can be directly inputted to the backlight control unit 24. The backlight control unit 24 is able to adjust the intensity of light emitted by the backlight 20 according to the inputted signal or photocurrent. The voltage supply unit 34 serves as a driving source of the photo sensor 30, and provides a specified voltage to the photo sensor 30.

Figure 3A:
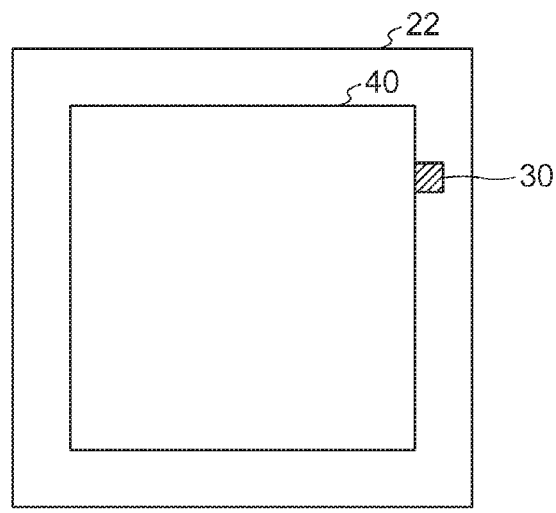
FIGS. 3A-3C illustrate disposition and construction of a photo-sensor used in a display device according to prior art.
Figure 3B:
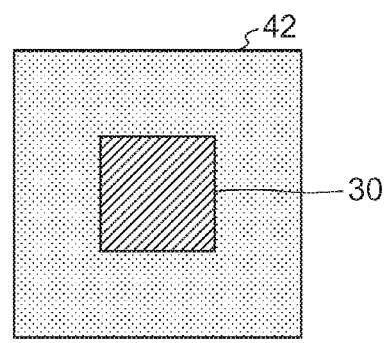
Figure 3C:
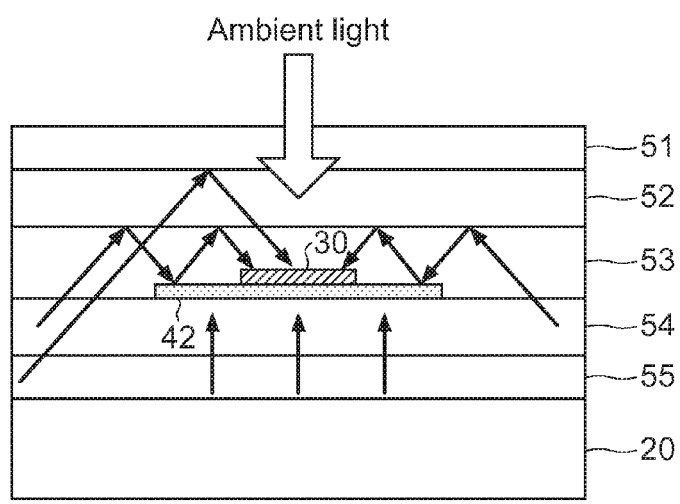

FIGS. 3A~3C illustrate disposition and construction of a photo sensor used in a display device according to prior art.

As shown in FIG. 3A, the LCD panel 22 is assembled with the photo sensor 30. The LCD panel 22 has an active region 40 with pixels arranged in matrix for displaying images. As shown, the photo sensor 30 is arranged adjacent to the active region 40.

FIG. 3B is an enlarged view of a part of FIG. 3A, showing the part around the photo sensor 30. A light-shielding plate 42 having a surface area much larger than the photo sensor 30 is disposed below the photo sensor 30. The light-shielding plate 42 is a shield provided for inhibiting the light emitted by the backlight 20 from reaching the photo sensor 30, and is generally made of metal.

FIG. 3C is a cross-sectional diagram showing a portion of the LCD panel 22 around the photo sensor 30. The layers formed on the LCD panel 22 sequentially, from top to bottom, include a first polarizer plate 51, a color filter layer 52, a liquid crystal layer 53, a glass substrate 54 and a second polarizer layer 55. In addition, the LCD panel 22 is disposed with the backlight 20 at a back thereof, i.e. the bottom layer as shown in FIG. 3C. Furthermore, although not shown in the drawing, a black matrix (BM) is actually disposed in the liquid crystal layer 53.

The photo sensor 30 is disposed on the light-shielding plate 42 formed on the glass substrate 54. The photo sensor 30 is an amorphous diode or an LTPS photo-diode which outputs photocurrent in response to light emission. Contributed to the light-shielding plate 42, light from the backlight 20 may not illuminate the photo sensor 30 directly, but may reach the photo sensor 30 as being reflected inside the LCD panel 22. Then the accuracy of the photo sensor 30 for detecting the ambient light is lowered.

Figure 4A:
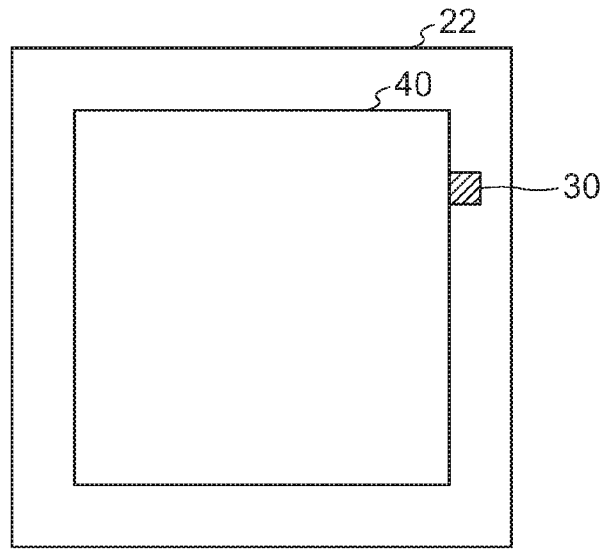
FIGS. 4A-4C illustrate disposition and construction of a photo-sensor used in a display device according to an embodiment of the present invention.
Figure 4B:
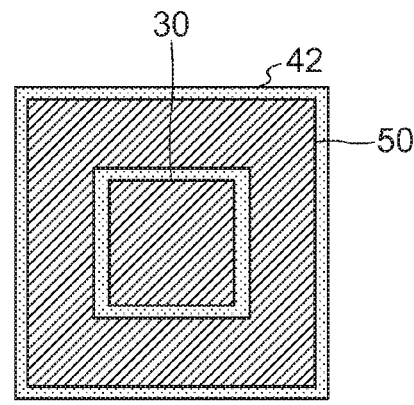
Figure 4C:
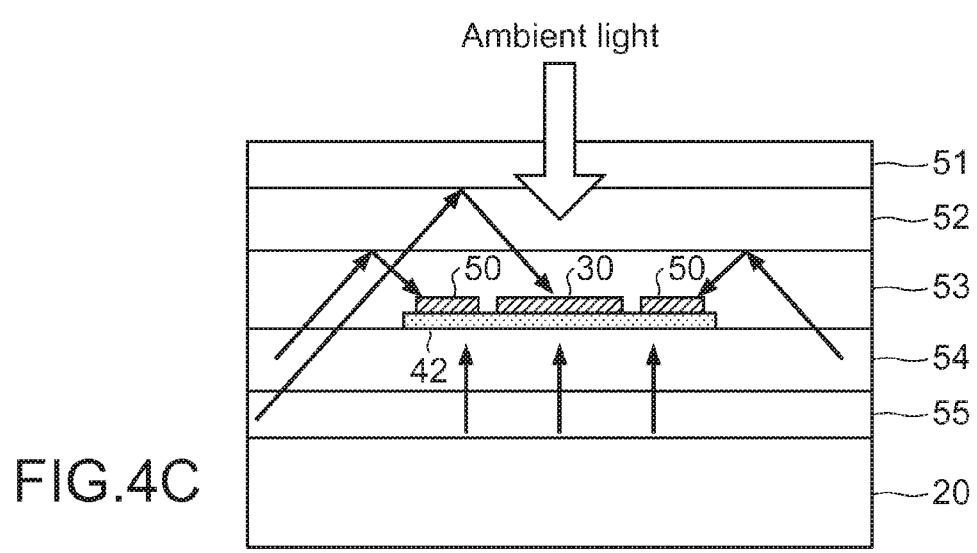

FIGS. 4A~4C illustrate disposition and construction of a photo sensor used in a display device according to an embodiment of the present invention.

As shown in FIG. 4A, the LCD panel 22 is assembled with the photo sensor 30. It is not necessary to use a specific manufacturing process for the photo sensor 30 to implement this design, and instead, a common TFT process for manufacturing an LCD panel can be used for the LCD panel 22 with the photo sensor 30. The LCD panel 22 has an active region 40 with pixels arranged in matrix. As shown, the photo sensor 30 is arranged adjacent to the active region 40.

FIG. 4B is an enlarged view of a part of FIG. 4A, showing the part around the photo sensor 30. A light-shielding plate 42 having a surface area much larger than the photo sensor 30 is disposed below the photo sensor 30. The light-shielding plate 42 is a shield provided for inhibiting the light emitted by the backlight 20 from reaching the photo sensor 30. According to an embodiment of the present invention, a pseudo photo sensor 50 is further formed on the light-shielding plate 42, surrounding the photo sensor 30. The pseudo photo sensor 50 is of the same material as the photo sensor 30, i.e. amorphous diode or an LTPS photo-diode. Therefore, it is not necessary to use a specific manufacturing process for the pseudo photo sensor 50 to implement this design, and instead, a common TFT process for manufacturing an LCD panel can be used for the pseudo photo sensor 50 with the photo sensor 30.

FIG. 4C is a cross-sectional diagram showing a portion of the LCD panel 22 around the photo sensor 30. The layers formed on the LCD panel 22 sequentially, from top to bottom, include a first polarizer plate 51, a color filter layer 52, a liquid crystal layer 53, a glass substrate 54 and a second polarizer layer 55. In addition, the LCD panel 22 is disposed with the backlight 20 at a back thereof, i.e. the bottom layer as shown in FIG. 4C. Furthermore, although not shown in the drawing, a black matrix (BM) is actually disposed in the liquid crystal layer 53.

The photo sensor 30 is disposed on the light-shielding plate 42 formed on the glass substrate 54. As shown in FIG. 4C, a pseudo photo sensor 50 is further disposed at both sides of the photo sensor 30. The pseudo photo sensor 50 is an amorphous diode or a low temperature polysilicon (LTPS) photo-diode, just like the photo sensor 30. However, the pseudo photo sensor 50 is not used as a detector for detecting light but used as a material for absorbing light. As shown, contributed to the light-shielding plate 42, light from the backlight 20 may not illuminate the photo sensor 30 directly, but may reach the photo sensor 30 indirectly through being reflected inside the LCD panel 22. Then the accuracy of the photo sensor 30 for detecting the ambient light is lowered. However, in this embodiment, the light reflected by the light-shielding plate 42 will not reach the photo sensor 30 due to the disposition of the pseudo photo sensor 50. In other words, compared to the prior art described with reference to FIG. 3A to FIG. 3C, the light scattering effect of the light from the backlight 20 inside the LCD panel 22 on the photo sensor 30 is less significant, and the accuracy of the photo sensor 30 for detecting the ambient light is improved. Preferably, the pseudo photo sensor 50 is designed to cover as large surface of the light-shielding plate 42 as possible except the surface carrying the photo sensor 30 in order to minimize light from the backlight 20 reflected by the light-shielding plate 42.

By arranging the pseudo photo sensor around the photo sensor according to an embodiment of the present invention, light scattering of the emitted light from the backlight inside the display device can be inhibited so as to provide the display device capable of detecting ambient light with enhanced accuracy and an electronic apparatus equipped with such a display device. Furthermore, since the pseudo photo sensor and the photo sensor are made of the same material, it is not necessary to perform an additional or specific process in order to produce a material which may achieve the similar effect of inhibiting the light scattering inside the display device. It is advantageous in manufacturing process and cost The invention is described as above based on preferred embodiments, but is not limited to the embodiments as described. Instead, modification or change may be made within the scope of the invention.

What is claimed is:

1. A display device having a backlight and a photo sensor for detecting ambient light and outputting a photocurrent according to an intensity of the ambient light, and further comprising:
    a light-shielding member disposed below the photo sensor for shielding light from the backlight; and
    a pseudo photo sensor disposed above the light-shielding member and disposed to surround and be spaced apart from the photo sensor;
    wherein the pseudo photo sensor is made of the same material as the photo sensor, is formed in the same process as the photo sensor, and absorbs light and does not delete light.

2. The display device according to claim 1 wherein the pseudo photo sensor is an amorphous diode or an LTPS photo-diode.

3. The display device according to claim 1 wherein the display device is a transparent or semi-transparent display.

4. An electronic apparatus comprising a display device as recited in claim 1.

5. An electronic apparatus comprising a display device as recited in claim 2.

6. An electronic apparatus comprising a display device as recited in claim 3.

* * * * *